(12) United States Patent
Erickson

(10) Patent No.: US 9,969,457 B2
(45) Date of Patent: May 15, 2018

(54) INTERCHANGEABLE FRONT FORK MECHANISM

(71) Applicant: Robert Allen Erickson, Minneapolis, MN (US)

(72) Inventor: Robert Allen Erickson, Minneapolis, MN (US)

( * ) Notice: Subject to any disclaimer, the term of this patent is extended or adjusted under 35 U.S.C. 154(b) by 85 days.

(21) Appl. No.: 15/018,592

(22) Filed: Feb. 8, 2016

(65) Prior Publication Data

US 2016/0152297 A1 Jun. 2, 2016

Related U.S. Application Data

(63) Continuation-in-part of application No. 13/958,707, filed on Aug. 5, 2013, now abandoned.

(60) Provisional application No. 61/679,921, filed on Aug. 6, 2012, provisional application No. 62/112,881, filed on Feb. 6, 2015.

(51) Int. Cl.

| B62K 25/08 | (2006.01) |
| B62K 21/24 | (2006.01) |
| B62K 13/00 | (2006.01) |
| B62K 21/12 | (2006.01) |
| B62K 21/02 | (2006.01) |
| B62K 13/04 | (2006.01) |

(52) U.S. Cl.
CPC ............. *B62K 21/24* (2013.01); *B62K 13/00* (2013.01); *B62K 13/04* (2013.01); *B62K 21/02* (2013.01); *B62K 21/12* (2013.01); *B62K 2206/00* (2013.01); *Y10T 29/49618* (2015.01)

(58) Field of Classification Search
CPC ........ B62K 21/24; B62K 13/00; B62K 21/02; B62K 21/12
USPC ....................................................... 280/279
See application file for complete search history.

(56) References Cited

U.S. PATENT DOCUMENTS

| 4,087,106 | A  | * | 5/1978  | Winchell  | B62B 13/12 |
|           |    |   |         |           | 180/183    |
| 5,320,374 | A  | * | 6/1994  | Farris    | B62K 21/20 |
|           |    |   |         |           | 188/271    |
| 6,623,021 | B1 | * | 9/2003  | Nelson    | B62H 5/02  |
|           |    |   |         |           | 280/204    |
| 6,685,206 | B1 | * | 2/2004  | Blake     | B62K 9/02  |
|           |    |   |         |           | 280/278    |
| 6,698,781 | B1 | * | 3/2004  | Blake     | B62K 21/18 |
|           |    |   |         |           | 280/279    |
| 7,896,362 | B1 | * | 3/2011  | Scatchard | B62K 13/00 |
|           |    |   |         |           | 280/7.1    |
| 2007/0138758 | A1 | * | 6/2007 | Chao   | B62K 15/00 |
|           |    |   |         |           | 280/279    |
| 2010/0308561 | A1 | * | 12/2010 | Diekman | B62K 15/006 |
|           |    |   |         |           | 280/638    |

* cited by examiner

*Primary Examiner* — Jacob D Knutson
(74) *Attorney, Agent, or Firm* — Mitchell | Hamline IP Clinic

(57) ABSTRACT

A bicycle apparatus with interchangeable front fork is disclosed. The bicycle comprises a frame and a quick release assembly for securing the removable front fork attachment assembly to the bicycle frame's head tube. The interchangeable front fork attachment assembly and quick release assembly allows for the quick interchanging of front fork with varying attachments which utilize different methods to achieve motion.

7 Claims, 11 Drawing Sheets

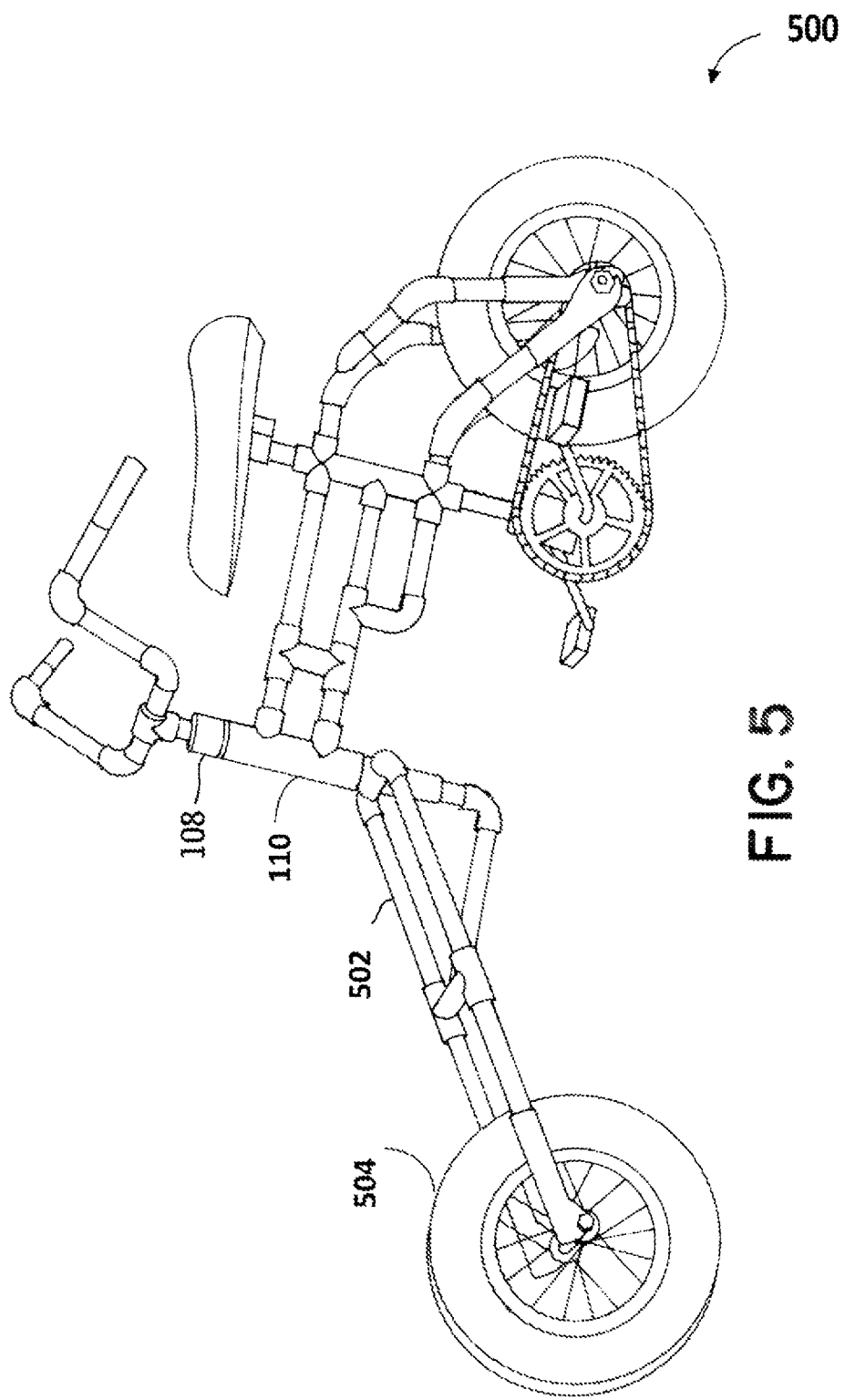

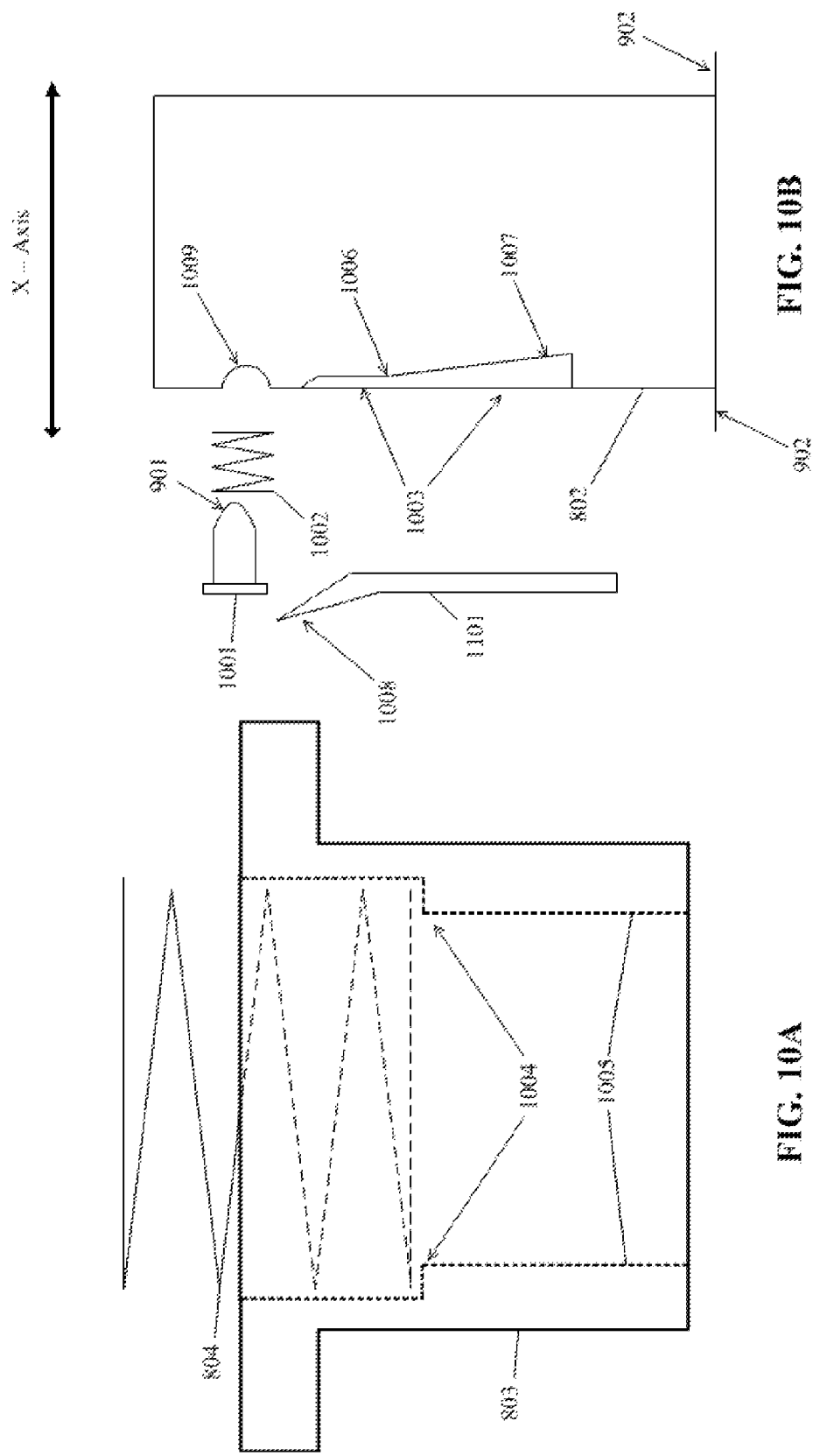

INTERCHANGEABLE FRONT FORK MECHANISM

CLAIM OF PRIORITY

This application is a continuation-in-part application of and claims priority to current U.S. Non-Provisional patent application Ser. No. 13/958,707, filed on Aug. 5, 2013, which application claims priority to U.S. Provisional Patent Application Ser. No. 61/679,921, filed on Aug. 6, 2012. This application also claims priority to current U.S. Provisional Patent Application Ser. No. 62/112,881, filed on Feb. 6, 2015, the contents of which are hereby incorporated by reference herein in their entireties.

TECHNICAL FIELD

This document generally relates to a multi-purpose type of recreational vehicle equipment, and more particularly, to a multi-purpose bicycle with an interchangeable front assembly such as a fork.

BACKGROUND

Traditional bicycles generally include two wheel assemblies: one for powering the bicycle and one for steering. Bicycles with various types of wheel assemblies have been designed for use in different situations, environmental conditions, and varying terrain. Typically, these bicycles are designed such that a specific type of wheel assembly can be fixed to the bicycle frame to achieve its intended purpose, which may make the bicycle as a whole specialized for a particular purpose.

Bicycles with fixed type wheel assemblies, or the particular-purpose bicycles, may be limited to use when the environment or road condition is suitable. For example, inclement weather conditions such as snow or ice, which are frequently experienced during the long winter season in northern areas, can substantially limit the utility of the Particular-purpose bicycles, thereby reducing their overall value to the users. The users of a particular-purpose bicycle may be forced to own recreational equipment of various types so that they can choose the proper equipment according to the weather conditions and selected terrain. This can be costly and inconvenient to the users. For example, a multitude of recreational vehicles can occupy a large storage space.

Multi-purpose bicycles have been proposed in which the front wheel assembly can be removed from the front fork assembly and replaced with a different assembly such as a ski. Although this approach attempts to address the functional limitations of the bicycles with a specific type of wheel assemblies, the replacement typically requires the user to disassemble the original configuration, and then reconfigure the bicycle for a different use whenever the user wishes variety or the conditions necessitate. The reconfiguration process can be time consuming and may require special tools or skills in order to complete the reconfiguration.

A bicycle with quick release wheel hub assemblies can allow a user to reconfigure the bicycle from a wheel to a different attachment such as a ski without the use of tools. However, the quick release wheel hub assemblies are prone to unintentional wheel release during use, increasing the risk of injury. Therefore, the present inventor has recognized that there remains a considerable need for a multi-purpose bicycle for use in various environmental conditions, and methods for configuring or reconfiguring such a bicycle to other desired forms of recreational equipment with improved efficacy a n d safety.

SUMMARY

Various embodiments described herein can help improve the functionality and the ease of use of a multi-purpose bicycle. For example, according to one embodiment of the present document, a vehicle apparatus can comprise a bicycle frame including a head tube, a front fork attachment assembly, a quick release assembly, and a front fork attachment. The quick release assembly can be configured to secure a proximal end of the front fork attachment assembly to an end of the head tube of the bicycle frame. The front fork attachment can be sized, shaped, or configured to secure permanently to the distal end of the front fork attachment assembly. The interchangeable front fork attachment assemblies can securely attach to a plethora of front fork attachment assemblies.

A method of reconfiguring a bicycle can comprise receiving a bicycle with a first detachable front fork attachment assembly attached to a bicycle frame through a head tube of the bicycle frame, where the first front fork attachment assembly can be coupled to a first front fork attachment. The method can include unlocking a quick release assembly, and detaching the first front fork attachment assembly from the bicycle frame when the quick release assembly is unlocked. A second detachable front fork attachment assembly, which is coupled to a second front fork attachment, can be received. The method can include attaching the second front fork attachment assembly to the bicycle frame through the head tube of the bicycle frame, and locking a quick release assembly to allow the reconfigured bicycle to be used in different conditions or environment.

A quick release assembly can be configured for securing a front fork attachment assembly to a head tube of a bicycle. The quick release assembly can include a lever, a n attachment clamp coupled to the lever, and an attachment port. The lever can be configured to toggle the attachment clamp between an open and a closed position. The attachment port can be fastened to the attachment clamp. At least a portion of the front fork attachment assembly can be insertable into the attachment port, and the front fork attachment assembly can be secured within the head tube via the attachment clamp.

The above summary of the various aspects and embodiments is not intended to describe each embodiment or every implementation of the bicycle with interchangeable front fork attachment assembly. Rather, the embodiments are chosen and described so that others skilled in the art may appreciate and understand the principles and practices of the bicycle with interchangeable front fork attachment assembly.

BRIEF DESCRIPTION OF THE DRAWINGS

While the bicycle with interchangeable front fork attachment assembly is amenable to various modifications and alternative forms, specifics thereof have been shown by way of example in the drawings and will be described in detail. Such embodiments are demonstrative and not intended to be exhaustive or exclusive embodiments of the present subject matter.

FIG. 5 is a perspective view of a multi-purpose bicycle with a raked front fork attachment assembly.

FIG. 10A-B is a detailed view of the disassembled quick connect mechanism.

DETAILED DESCRIPTION

Disclosed herein is a multi-purpose vehicle, such as a bicycle, for entertainment or general transportation purposes. The bicycle can include a front fork assembly configured to be coupled to a variety of interchangeable front fork attachments. The interchangeable front fork attachments, such as those conditioned for various terrain types or weather conditions, can increase the utility of the bicycle, reduce the need for separate recreational vehicles for separate terrain, and reduce the physical storage space an owner may otherwise need. Although a recreational vehicle such as a recreational bicycle is provided as an example in this document, the apparatus and the methods described herein can be adapted to configure a vehicle to other types of two or multiple wheeled motorized or manually powered vehicles.

Figure 1:
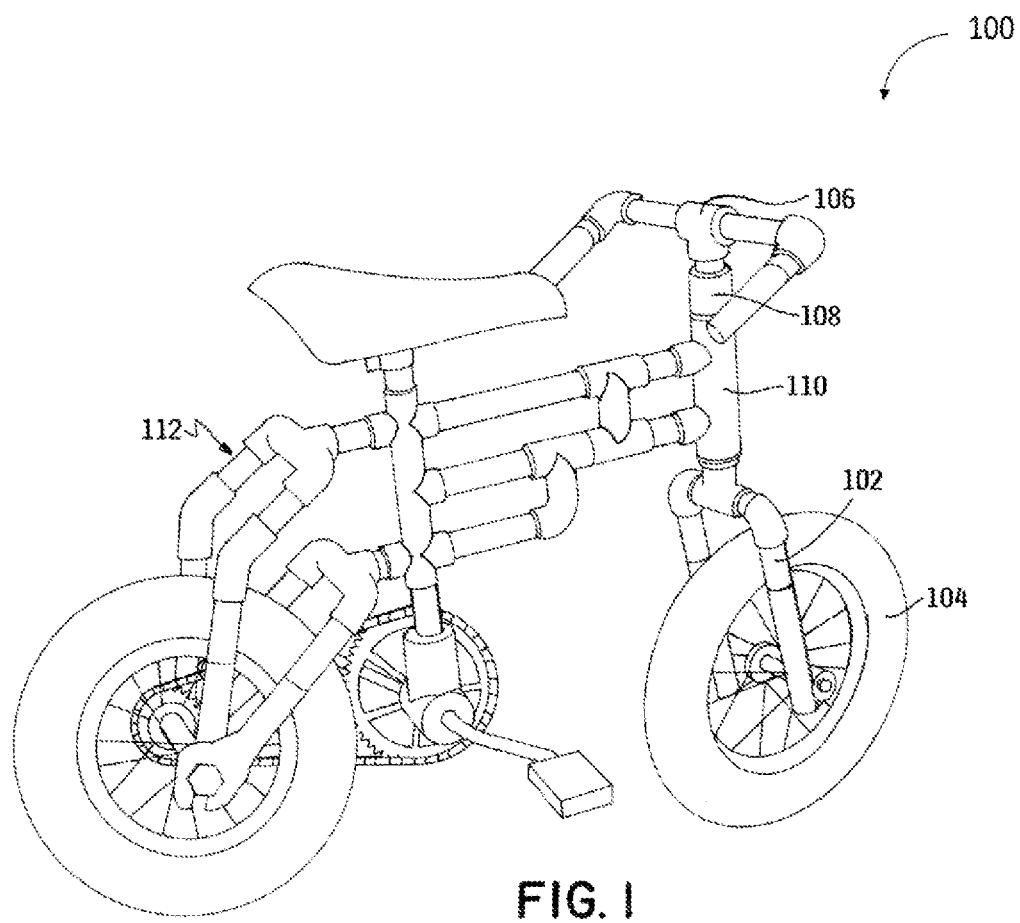
FIG. 1 is a perspective view of a multi-purpose bicycle with interchangeable front fork, according to some embodiments.

FIG. 1 is a perspective view of a multi-purpose bicycle 100 with interchangeable front fork, according to some embodiments. The bicycle 100 can include a front fork attachment assembly 102, a front fork attachment 104, a handlebar assembly 106, a quick release assembly 108, and a bicycle frame 112. The bicycle frame 112 can include a head tube 110 disposed at the front of the bicycle 100.

The front fork attachment assembly 102 can be secured to the bicycle frame 112 via a quick release assembly 108. The quick release assembly 108 can be mounted directly adjacent to the head tube 110. The head tube 110 can be made as a hollow cylindrical tube and can be permanently fastened to the bicycle frame 112. The head tube 110 can allow a front fork attachment assembly 102 and/or a handlebar assembly 106 to be inserted into or otherwise fastened to the head tube 110, and further secured to the bicycle frame 112 via the quick release assembly 108. The head tube 110 can be constructed from a variety of materials including steel, aluminum, titanium, or other suitable metals, or non-metals which allow a front fork attachment assembly 102 or a handlebar assembly 106 to be reliably secured to the bicycle frame 112.

The front fork attachment assembly 102 can be constructed as a pair of supports, secured to one another. The front fork attachment assembly 102 can be connected at one end to a front fork attachment 104, and at another end be insertable within the head tube 110. In an example, the front fork attachment assembly 102 can include a proximal end and a distal end. The proximal end of the front fork attachment assembly 102 can be sized, shaped, or otherwise configured to be secured to the head tube 110, and thereby secured to the bicycle frame 112. The distal end of the front fork attachment assembly 102 can be sized, shaped, or otherwise configured to be coupled to one of a variety of front fork attachments 104.

The front fork attachment assembly 102 can be made out of a variety of materials including steel, aluminum, titanium, or other suitable metals. The front fork attachment assembly can also be made out of non-metal, synthetic materials such as plastic, polymers, or other materials with desired strength and durability that allow the front fork attachment assembly 102 to reliably support the weight of a user operating the multi-purpose bicycle 100.

A plurality of front fork attachment assemblies 102 and front fork attachments 104 can allow the user to quickly insert and secure the chosen front fork attachment assembly 102 with a desired front fork attachment 104 according to terrain, weather, or other conditions or recreational purposes. Examples of the fork attachment 104 can include a ski, a snowboard, an ice skate, and one or multiple wheel assemblies, among others. In some examples, at least a portion of the front fork attachment assembly 102 can be made at a uniform size or shape such that multiple front fork attachment assemblies 102 can be interchangeably attached to or detached from the head tube 110. For example, the front fork attachment assembly 102 can have a uniform size and shape on at least the proximal end of the attachment assembly 102 such that various types of front fork attachment assembly 102 can be securely attached to the distal end of the head tube 110.

In an example, the front fork attachment assembly 102 can be permanently attached to a front fork attachment 104 to form an integrated unit, such that the front fork attachment assembly 102 and the associated front fork attachment 104 can be jointly attached to or detached from the head tube 110. The permanently attached front fork attachment 104 can allow the user to quickly assemble a desired front fork attachment 104 and the front fork attachment assembly 102, or to efficiently replace an existing front fork attachment assembly 102 with another front fork attachment assembly 102 of the same or different type. In another example, the front fork attachment assembly 102 can be configured such that the front fork attachment 104 can be detachable from the front fork attachment assembly 102 and interchanged with another front fork attachment 104. For example, a wheel can be detached from the front fork assembly 102, and a ski can be attached to the same front fork attachment assembly 102 for use in the bicycle 100.

The quick release assembly 108 can be mounted adjacent to a proximal end or a distal end of the head tube 110. The quick release assembly 108 can be constructed in a variety of ways, including but not limited to a push-button coupler joint, cotter key/pin, screw and wing-nut, clamp, or other types of securable connections. The quick release assembly 108 can be configured to secure interchangeable front fork attachment assembly 102 and can allow for the multi-purpose bicycle 100 to be adapted for variable conditions. The quick release assembly 108 can secure a handlebar assembly 106 to the head tube 110, thereby connecting the handlebar assembly 106 to the bicycle frame 112. In an example, the handlebar assembly 106 has at least a portion shaped and configured to be insertable into or otherwise coupled to the proximal end of the head tube 110. The quick release assembly 108 can be configured to secure a user-selected handlebar assembly 106 to the head tube 110, or to detach the handlebar assembly 106 from the head tube 110. The quick release assembly 108 can be configured to secure or release both the front fork attachment assembly 102 and the handlebar assembly 106 to or from the head tube 110 separately or concurrently.

Figure 2:
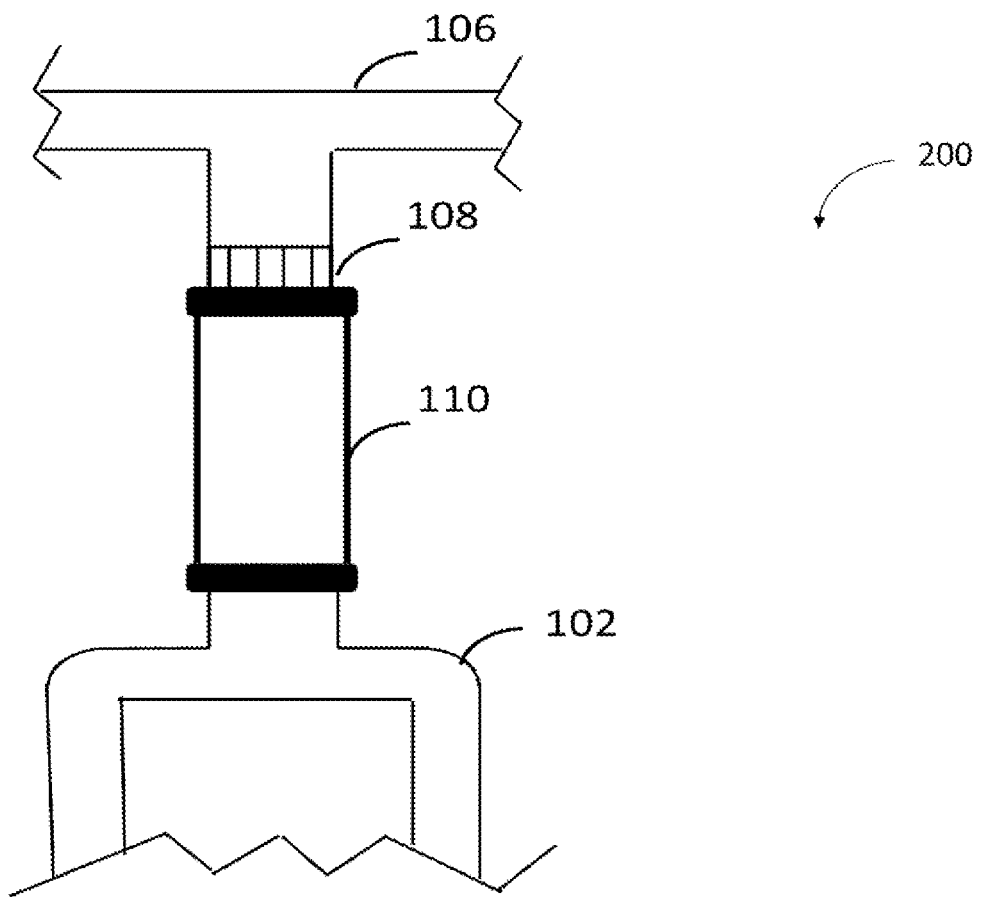
FIG. 2 is a front view of a front fork attachment assembly of the bicycle of FIG. 1.

FIG. 2 is a front view of a front fork attachment assembly 102 of the bicycle of FIG. 1. The front fork attachment assembly 102 can be secured to the cylindrical-shaped head tube 110 of the bicycle frame via the quick release assembly 108.

The proximal end of the front fork attachment assembly 102 can be sized, shaped, or otherwise configured to be coupled to at least a portion of the head tube 110. For example, the proximal end of the front fork attachment assembly 102 can have at least a partially cylindrical shape coaxial with the head tube 110, and a diameter smaller than that of the distal end of the head tube 110 to facilitate the insertion of the proximal end of the front fork attachment assembly 102 into the distal end of the head tube 110.

The distal end of the handlebar assembly 106 can be sized, shaped, or otherwise configured to be coupled to at least a portion of the head tube 110. For example, the distal end of the handlebar assembly 106 can have at least a partially cylindrical shape coaxial with the head tube 110, and a diameter smaller than that of the proximal end of the head tube 110 to facilitate the insertion of the distal end of the handlebar assembly 106 into the proximal end of the head tube 110.

As illustrated in FIG. 2, the quick release assembly 108 can be mounted adjacent to the proximal end of the head tube 110. The quick release assembly 108 can be configured to secure the handlebar assembly 106 or the front fork attachment assembly 102 to the head tube 110 through a proximal end or a distal end of the head tube 110, when the handlebar assembly 106 or the front fork attachment assembly 102 is inserted or otherwise coupled to the head tube 110. The quick release assembly 108 can also release the handlebar assembly 106 or the front fork attachment assembly 102 from the head tube 110. In an example, the quick-release assembly 108 can secure or release the handlebar assembly 106 and the front fork attachment assembly 102 separately. In another example, the quick release assembly 108 can secure or release the handlebar assembly 106 and the front fork attachment assembly 102 concurrently.

Figure 3:
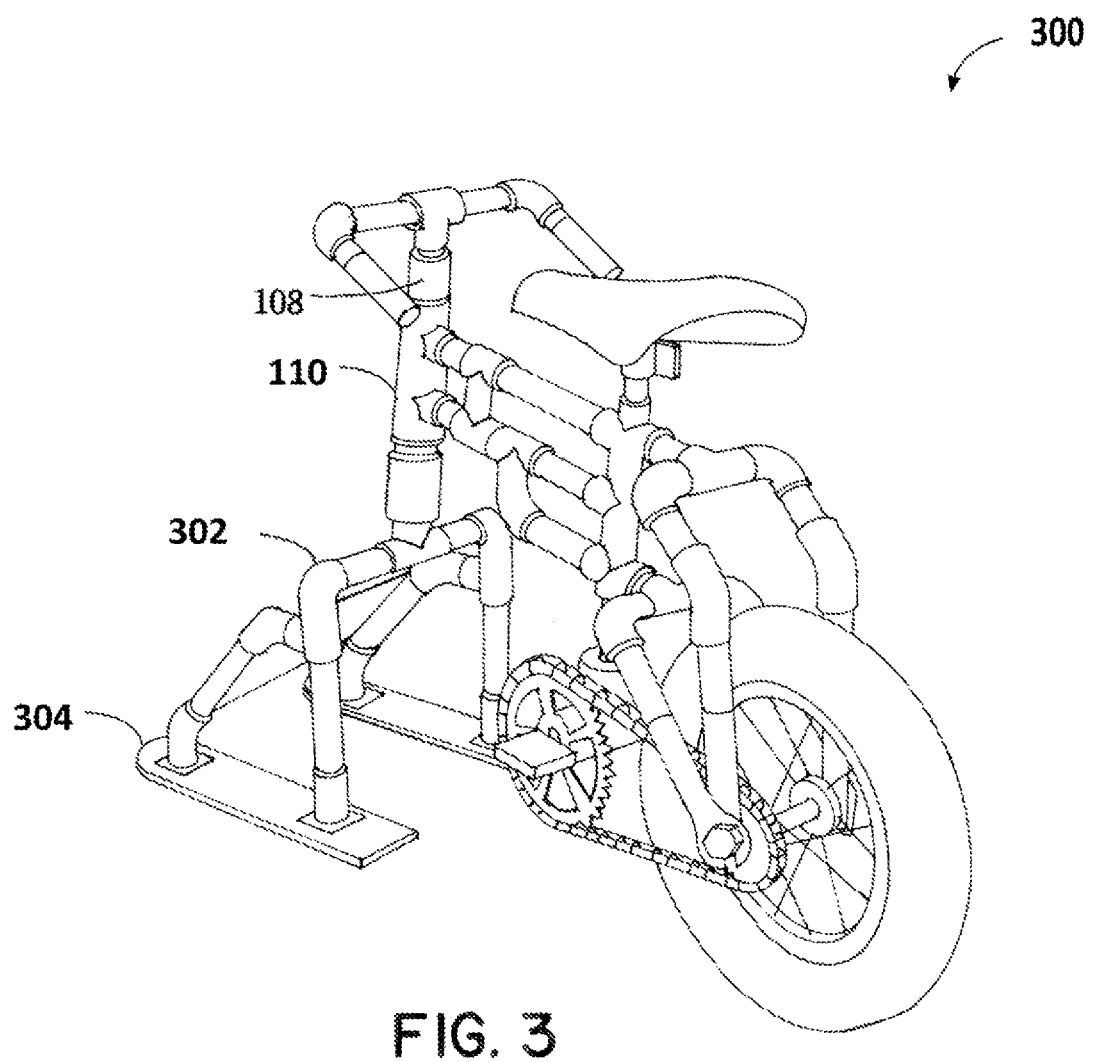
FIG. 3 is a perspective view of a multi-purpose bicycle with a dual ski front fork attachment assembly.

FIG. 3 is a perspective view of a multi-purpose bicycle 300 with a removable front fork attachment assembly 302 and quick release assembly 108. The front fork attachment assembly 302 is coupled to a dual-ski fork attachment 304 which may be used in snow or ice conditions. The front fork attachment assembly 302 includes a proximal end sized, shaped, or otherwise configured to be insertable into a head tube 110 of the bicycle when the front fork attachment assembly 302 or the dual-ski fork attachment 304 is user-adjusted to a desired height or position. The quick release assembly 108 can engage the head tube 110 such as to tightly secure the inserted portion of the front fork attachment assembly 302 within the head tube 110. In an example, the dual-ski fork attachment 304 can be permanently attached to the front fork attachment assembly 302, such that the dual-ski fork attachment 304 and the front fork attachment assembly 302 can be jointly attached to or released from the head tube 110.

Figure 4:
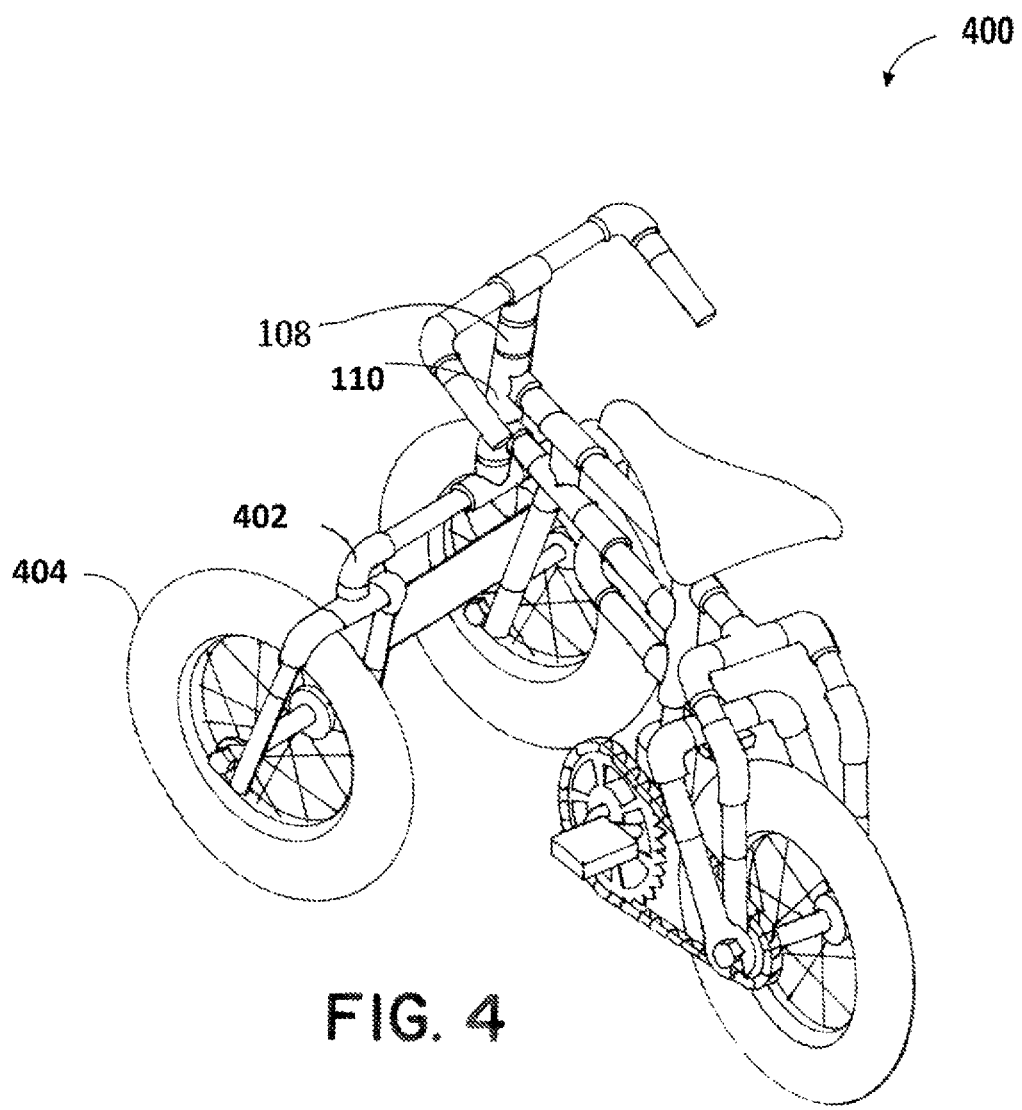
FIG. 4 is a perspective view of a multi-purpose bicycle with a dual wheel front fork attachment assembly.

FIG. 4 is a perspective view of a multi-purpose bicycle 400 with a removable front fork attachment assembly 402 and quick release assembly 108. The front fork attachment assembly 402 is coupled to a dual-wheel fork attachment 404 which may be used in various road conditions or terrain such as for enhanced stability. The front fork attachment assembly 402 includes a proximal end sized, shaped, or otherwise configured to be insertable into the head tube 110 of the bicycle when the front fork attachment assembly 402 or the dual-wheel fork attachment 404 is user-adjusted to a desired height or position, such as to level with the rear wheel of the multi-purpose bicycle 400. The quick release assembly 108 can engage the head tube 110 to tightly secure the inserted portion of the front fork attachment assembly 402 within the head tube 110. The dual-wheel fork attachment 404 can be permanently attached to the front fork attachment assembly 402, such that the dual-wheel fork attachment 404 and the front fork attachment assembly 402 can be jointly attached to or released from the head tube 110.

FIG. 5 is a perspective view of a multi-purpose bicycle of 500 with removable front fork attachment assembly 502 and quick release assembly 108. The front fork attachment assembly 502 is raked which may be used in various conditions such as for recreational sports. The front fork attachment assembly 502 includes a proximal end sized, shaped, or otherwise configured to be insertable into the head tube 110 of the bicycle when the front fork attachment assembly 502 or the attached raked front wheel fork attachment 504 is user-adjusted to a desired height or position, such as to level with the rear wheel of the multi-purpose bicycle 500. The quick release assembly 108 can engage the head tube 110 such as to tightly secure the inserted portion of the front fork attachment assembly 502 within the head tube 110. The raked front wheel fork attachment 504 can be permanently attached to the front fork attachment assembly 502, such that the raked front wheel fork attachment 504 and the front fork attachment assembly 502 can be jointly attached to or released from the head tube 110.

Figure 6A:
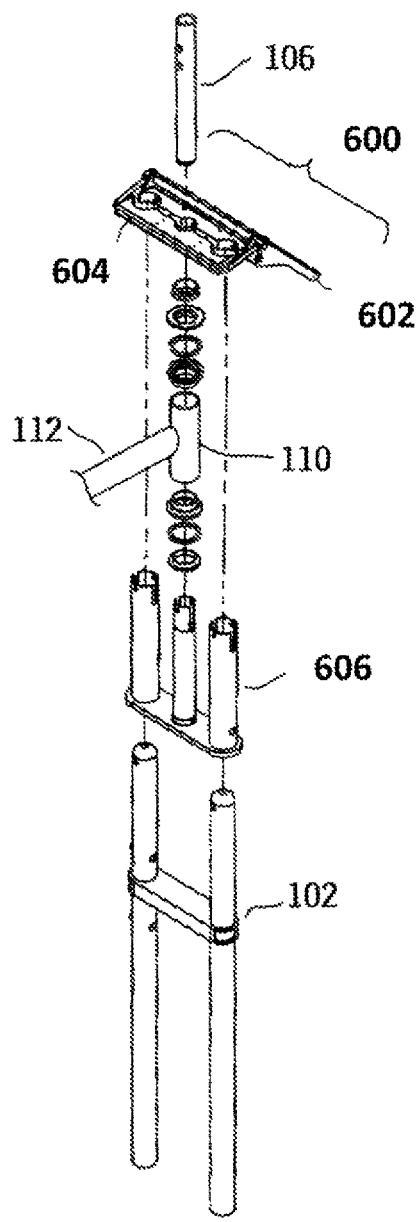
FIGS. 6A-B are perspective views of quick release assemblies and portions of the environment in which the quick release assembly operates, according to some embodiments.
Figure 6B:
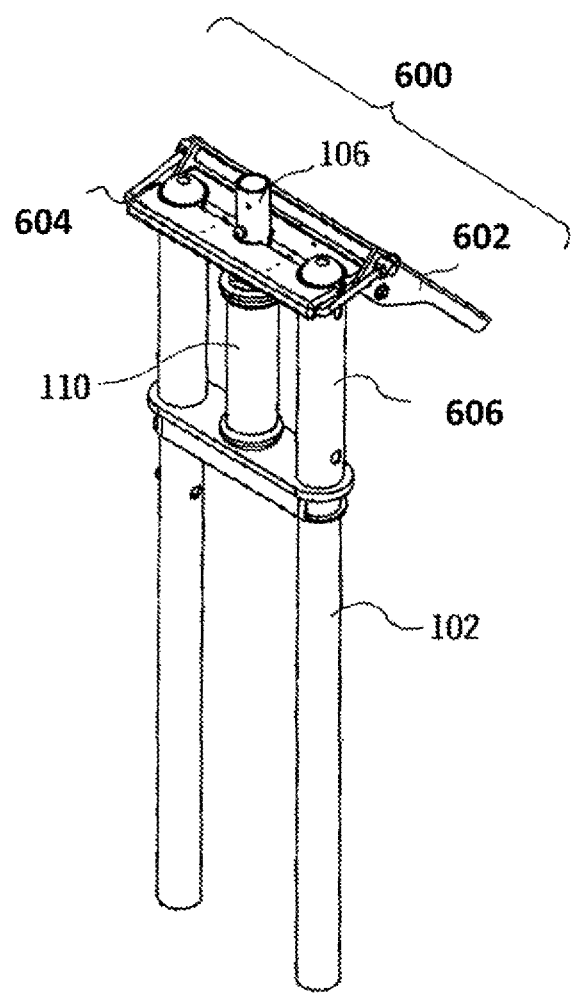

FIGS. 6A-B are perspective views of a quick release assembly 600 and portions of the environment in which the quick release assembly 600 operates, according to some embodiments. The quick release assembly 600 is an example of the quick release assembly 108. Therefore, the quick release assembly 600 can be used in any of multi-purpose bicycles as shown in FIGS. 1, 3, 4, and 5.

FIG. 6A illustrates various components and the configuration of the quick release assembly 600, and FIG. 6B is a perspective view of the assembled quick release assembly 600. The quick release assembly 600 may include a lever 602, an attachment clamp 604 coupled to the lever 602, and an attachment port 606. The lever 602 can be configured to toggle the attachment clamp 604 between an open and a closed position. As illustrated in FIG. 6A, when the lever 602 toggles the attachment clamp 604 to the close position, the attachment clamp 604 can secure the front fork attachment assembly 102 through a portion of the front fork attachment assembly 102 inserted within the attachment port 606. The attachment port 606 can have multiple port compartments each sized, shaped, or otherwise configured to accommodate a respective attachment such as the front fork attachment assembly 102 and the handlebar assembly 106.

As illustrated in FIGS. 2A and 2B, the attachment port 606 can include three linearly arranged port compartments parallel to each other. The two outer port compartments can allow for insertion by the two supports of the front fork attachment assembly 102, and the center port compartment can allow for insertion by the handlebar assembly 106 through the head tube 110.

The closing of the attachment clamp 604 can secure the handlebar assembly 106 through a partially inserted portion within the attachment port 606. In some examples, the attachment port 606 can be configured to allow for both the handlebar assembly 106 and the front fork attachment assembly 102 to be simultaneously secured to the bicycle frame 112.

At least a portion of the attachment port 606 can be inserted into the head tube 110. For example, the attachment port 606 can include a cylindrical portion coaxial with the head tube 110, where the cylindrical portion of the attachment port 606 can have a diameter smaller than that of the head tube 110 such as to facilitate the insertion of the attachment port into the head tube. The respective coupling portions of the attachment port 606 and the head tube 110 can include mechanisms configured to allow for the handlebar assembly 106 to be rotated freely within the head tube 110. For example, the respective coupling portions of the attachment port 606 and the head tube 110 can be coupled to one or more bearings such as ball bearings, roller bearings, or other bearings, or be processed with lubrication including bearing grease.

The quick release assembly 600 can include a confirmation mechanism providing feedback to the user about the attachment or detachment between the front fork attachment assembly 102 and the attachment port 606. The confirmation mechanism can include visual, audio, audio-visual, or other types of confirmation mechanisms. In an example, the quick release assembly 600 may include an indicator invisible when the front fork attachment assembly 102 is not properly inserted. The indicator pops up on or around the outer surface of the quick release assembly 600 and becomes visible to the user only when the front fork attachment assembly 102 is properly inserted. In an example, the indicator, when popping up, can generate a audible sound alerting the user the proper insertion. Same or similar visual or audio confirmation mechanisms can be used to indicate that the handlebar assembly 106 is properly inserted and secured within the attachment port 606.

The quick release assembly 600 can be constructed from a variety of materials including steel, aluminum, titanium, or other suitable metals, or non-metals which allow the quick release assembly 600 to reliably secure the front fork attachment assembly 102 and or the handlebar assembly 106 to the bicycle frame 112.

Figure 7:
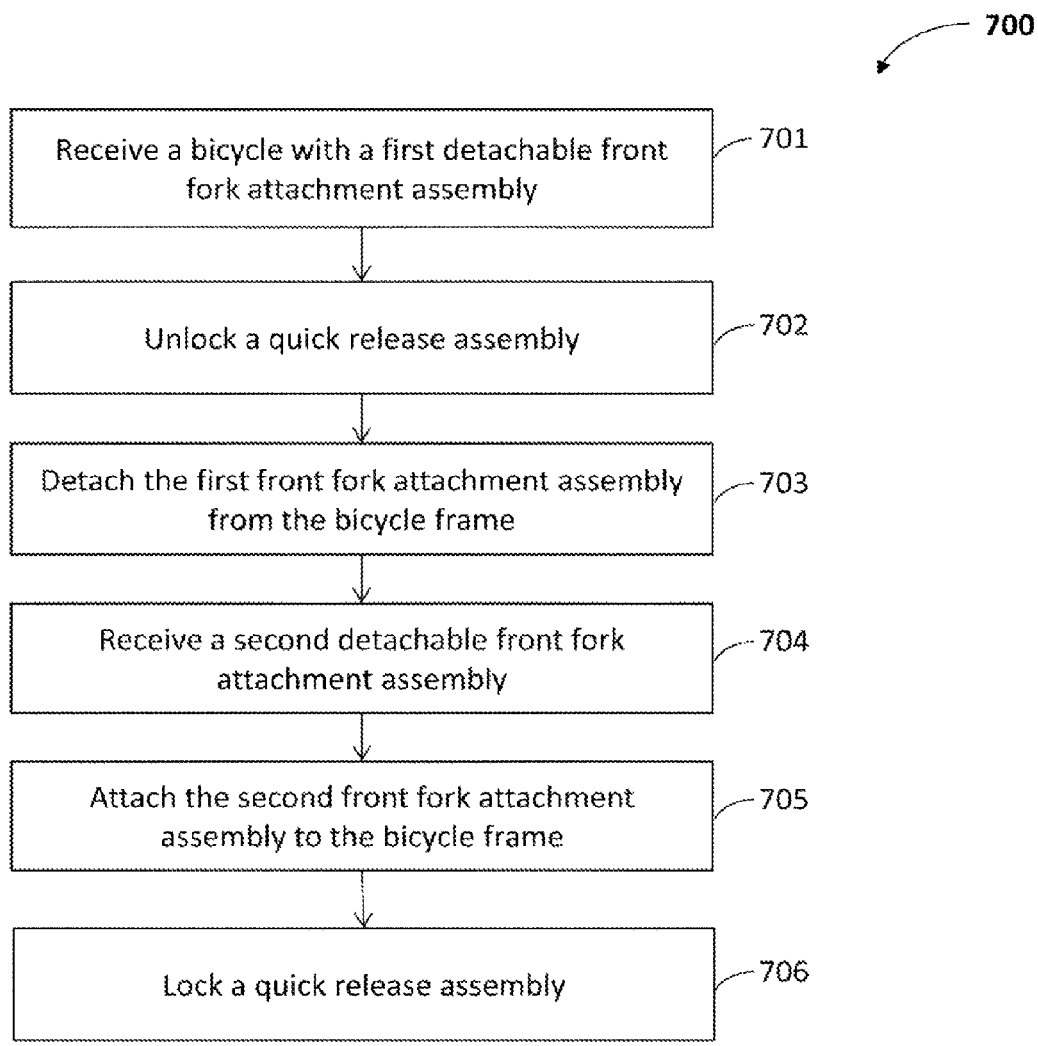
FIG. 7 illustrates an example of a method for reconfiguring the multi-purpose bicycle of FIGS. 1-5.

FIG. 7 illustrates an example of a method 700 for reconfiguring a multi-purpose bicycle. The method 700 can be used in assembling a multi-purpose bicycle with interchangeable front fork attachment assembly such as one of the multi-purpose bicycles 100, 300, 400 or 500 and the several fork attachments, as illustrated in FIGS. 1-5.

At 701, a bicycle with a first detachable front fork attachment assembly is obtained, received or otherwise available. The bicycle, such as one of the multi-purpose bicycles 100, 300, 400 or 500, can include a quick release assembly that can tightly secure the first front fork attachment assembly to the bicycle frame such as through a head tube. In an example, the head tube can have a hollow cylindrical shape that accommodates at least a portion of the first front fork attachment assembly insertable into the head tube. The first front fork attachment assembly can include and may be permanently coupled to a front fork attachment such as a ski, a snowboard, an ice skate, one or more wheels, or other fork attachments.

At 702, the quick release assembly can be unlocked such as to allow the secured first front fork attachment assembly to be removable from the bicycle frame. The quick release assembly can include one or more of securable connections such as a push-button coupler joint, a cotter key or pin, a screw, or a wing-nut. The quick release assembly can be manually adjusted to either a lock position or an unlock position. When setting to the unlock position, the quick release assembly can disengage at least the portion of the first front fork attachment assembly from the head tube of the bicycle. For example, unlocking the quick release assembly can release the proximal end of the first front fork attachment assembly from the head tube of the bicycle.

The first front fork attachment assembly can be detached from the bicycle frame at 703 when the quick release assembly is unlocked. For example, the inserted portion of the first front fork attachment assembly can be removed from the distal end of the head tube. The front fork attachment associated with the first front fork attachment assembly can also be detached from the bicycle.

At 704, a second detachable front fork attachment assembly may be selected, received or otherwise available. The second front fork attachment assembly can include and/or be coupled to a second front fork attachment such as a ski, a snowboard, an ice skate, one or more wheel assembly, among others. The second front fork attachment assembly can be of a different type than the first front fork attachment assembly, and may be adapted to be used in a condition or environment different than what the first front fork attachment assembly is used for, or for a different recreational activity as a user may choose. In an example, the second front fork attachment assembly can be of a same or similar type as the first front fork attachment assembly, such as to replace a malfunctioned or defected first front fork attachment assembly and use the bicycle in a manner or under conditions similar to that where the first front fork attachment assembly is used.

At 705, the second front fork attachment assembly can be attached to the bicycle frame such as through an end of the head tube from which the first front fork attachment assembly is detached. For example, the proximal end of the second front fork attachment assembly can have at least a partially cylindrical shape coaxial with the head tube, and a diameter smaller than that of the distal end of the head tube such as to facilitate the insertion of the proximal end of the second front fork attachment assembly into the distal end of the head tube.

At 706, the quick release assembly can be locked such as to allow the inserted portion of the second front fork attachment assembly to be tightly secured within the head tube of the bicycle. The one or more securable connections within the quick release assembly can be manually adjusted to a lock position, and the quick release assembly can engage at least the portion of the second front fork attachment assembly to the head tube of the bicycle.

In an example, the quick release assembly can comprise a lever, an attachment clamp coupled to the lever, wherein the lever is configured to toggle the attachment clamp between an open and a closed position, and an attachment port fastened to the attachment clamp wherein at least a portion of the front fork attachment assembly is insertable into the attachment port, wherein the front fork attachment assembly is securable within the head tube via the attachment clamp.

In an example, a handlebar assembly can be insertable into the attachment port and wherein the handlebar assembly is securable within the attachment port via the attachment clamp.

In an example, the quick release assembly can be made of metal selected from a group consisting of steel, aluminum, and titanium.

In an example, the quick release assembly can be configured to display at least one of a visual confirmation or an audio confirmation of the front fork attachment assembly inserted and secured within the attachment port.

In an example, the quick release assembly can be configured to display at least one of a visual confirmation or an audio confirmation of the handlebar assembly inserted and secured within the attachment port.

Figures 8A, 8B:
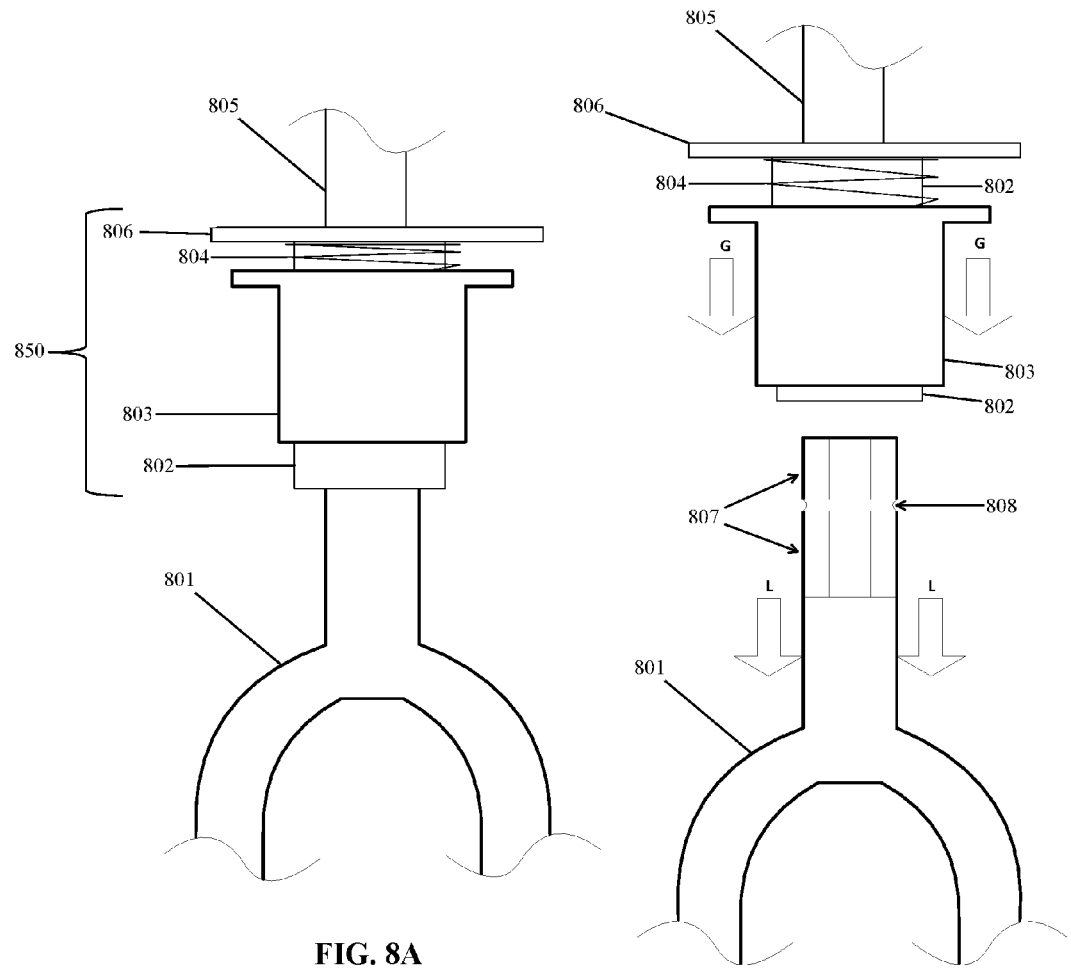
FIG. 8A-B illustrate the operation of the quick connect mechanism.
Figure 9:
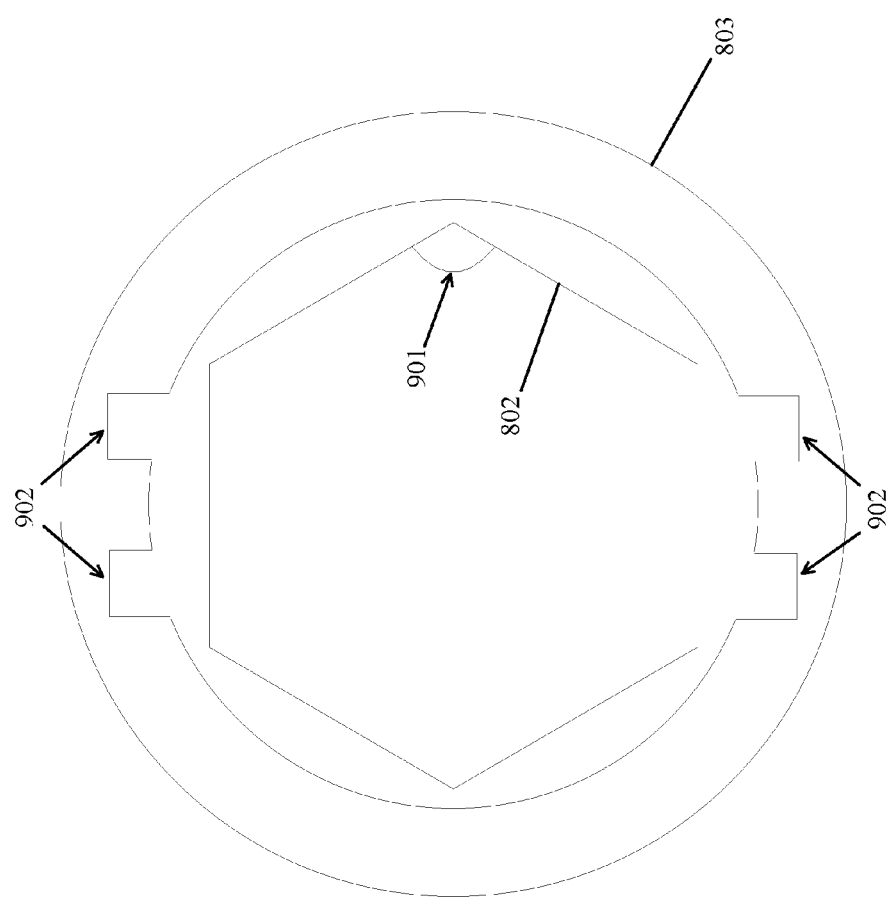
FIG. 9 is a view of the quick connect mechanism from the perspective of the insertion point of the front fork assembly.

Shown below in FIGS. 8-11 is an exemplary embodiment of a quick release assembly. FIGS. 8-9 are intended to show the general function and design of the quick release assembly. FIGS. 10-11 have been drawn to show one example of how the internal mechanism of the quick release assembly may operate.

FIGS. 8A and 8B are external views of the quick release assembly. FIG. 8A shows the quick assembly while the front fork attachment 801 is still connected to the quick connect mechanism 850. FIG. 8B shows how the quick connect mechanism 850 is operated so that the front fork attachment 801 can be released from the inner connect socket 802.

Looking at FIG. 8A, the main external parts of the quick connect mechanism 850 are the inner connect socket 802, the outer slide cover 803, the positioning spring 804, and the outer flange 806. The cylindrical inner connect socket 802, shown in more detail in FIGS. 9-11, acts as the receiving port for the front fork attachment 801. The outer slide cover 803, which goes around the outside of the inner connect socket 802, is held in place by the positioning spring 804 and is used to unlock the front fork assembly 801 from the inner connect socket 802. The outer flange 806 provides a base for the rest of the quick connect mechanism 850. Both the inner connect socket 802 and positioning spring 804 are anchored to the outer flange 806. There are multiple ways for the inner connect socket 802 and positioning spring 804 to be connected to the outer flange 806; for example, they may be welded onto the outer flange 806, the outer flange 806 may be threaded so that the the inner connect socket 802 can screw into it, or the outer flange 806 may have been tunneled to allow the positioning spring 804 to wind into the flange. Depending upon the inner mechanisms of the quick connect mechanism 850, the positioning spring 804 may not need to be anchored to the outer flange 804 because in some embodiments it would only serve to prevent the flange from being pressed upward into a release position. Lastly, the other end of the outer flange 806 is connected to the upper bike frame 805, which would connect this quick connect mechanism 850 to the rest of the bike frame and handlebars.

FIG. 8B contains the same elements as FIG. 8A, but depicts the quick connect mechanism 850 in a position where the front fork assembly 801 can disengage from the inner connect socket 802. The quick connect mechanism 850 allows the front fork assembly 801 to disengage from inner connect socket 802 when the outer slide cover 803 has been pushed in direction G (against the bias of the positioning spring 804). The end of the front fork assembly 801 has a hexagonal shaped end 807 with an intermediary channel 808 that allows for the locking pin head 901 (not shown) to engage with the end of the front fork assembly 801 and lock the front fork assembly 801 into place. The intermediary channel 808 is a depression around the hexagonal shaped end 807 such that the locking pin head 901 can push into it and prevent the vertical movement of the front fork assembly 801. In alternate embodiments, the hexagonal shaped end 801 could be in any other shape, but was chosen because this shape helps prevents the front fork assembly from rotating; a circular end should be avoided as it would put more pressure on the locking pin head 901 (not shown). Alternate embodiment may also allow for the outer slide cover 803 to slide in the opposite direction of direction G to release the front end assembly 801; the direction the outer slide cover must be pushed is dependent upon the inner mechanism of the quick connect mechanism.

FIG. 9 is a detailed view of the quick connect mechanism 850 to show the insertion slot of the inner connect socket 802 that end of the front end assembly 801 inserts into. The insertion slot of the inner connect socket 802 has a locking pin head 901 that sticks out into the insertion slot and is configured to lock the front end assembly 801 into the insertion slot when the locking pin head 901 pushes into the intermediary channel 807 of the front end assembly 801. The inner connect socket also includes stopping tabs 902 that prevents the outer slide cover 803 from being forced off the inner connect socket 802. These stopping tabs 902 could be connected in a number of different ways, including being welded or screwed onto the inner connect socket 802. This embodiment shows four stopping tabs 902, but any number of tabs could be used.

FIGS. 10A and 10B show the disassembled quick connect mechanism 850. FIG. 10A depicts the outer slide cover 803 and includes the internal view of the outer slide cover 1005 (shown in the dash lines). Also shown (in dashed lines) is the outer slide cover's inside shape 1005. The inside of the outer slide cover 803 includes an inside ridge 1004. The inside ridge 1004 can be used in attaching the positing spring 804 to the outside slid cover. The positioning spring 804 can be attached to the inside ridge 1004 in many different ways; for example, they could be attached by being welded together or the end of the positioning spring 804 could be designed to allow it to be screwed into the inner wall of the outer slide cover. The most important function of the inside ridge 1004 is to help in the operation of the pin lever 1101 (which will be explained in more detail when descripting FIGS. 11A and 11B). FIG. 10B is a detailed view of the locking mechanism, which includes the pin lever 1101, locking pin 1001, locking pin spring 1002, and the inner connect socket 802. The inner connect socket 802 has an inner pin hole 1009 (which allows for the locking pin 1001 and locking pin head 901 to pass through the inner connect socket 802) and lever groove 1003. The lever groove 1003 is a groove in the inner connect socket 802 that the pin lever 1101 is seated in during the quick connect mechanism's 850 operation. An important feature of the lever groove 1003 is its balancing point ridge 1006 and lever trough 1007. These features allow the lever pin's point 1008 to move in along the X-axis to change the position of the locking pin 1001 and locking pin head 901.

Figure 11B:
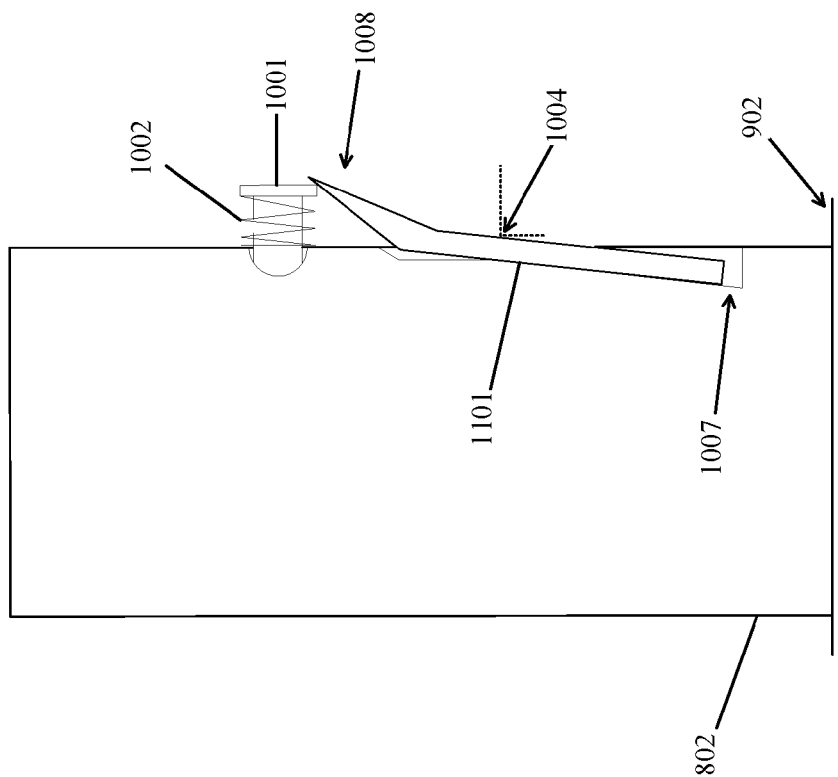
FIG. 11A-B shows how the inner mechanism of the quick connect mechanism operates.
Figure 11A:
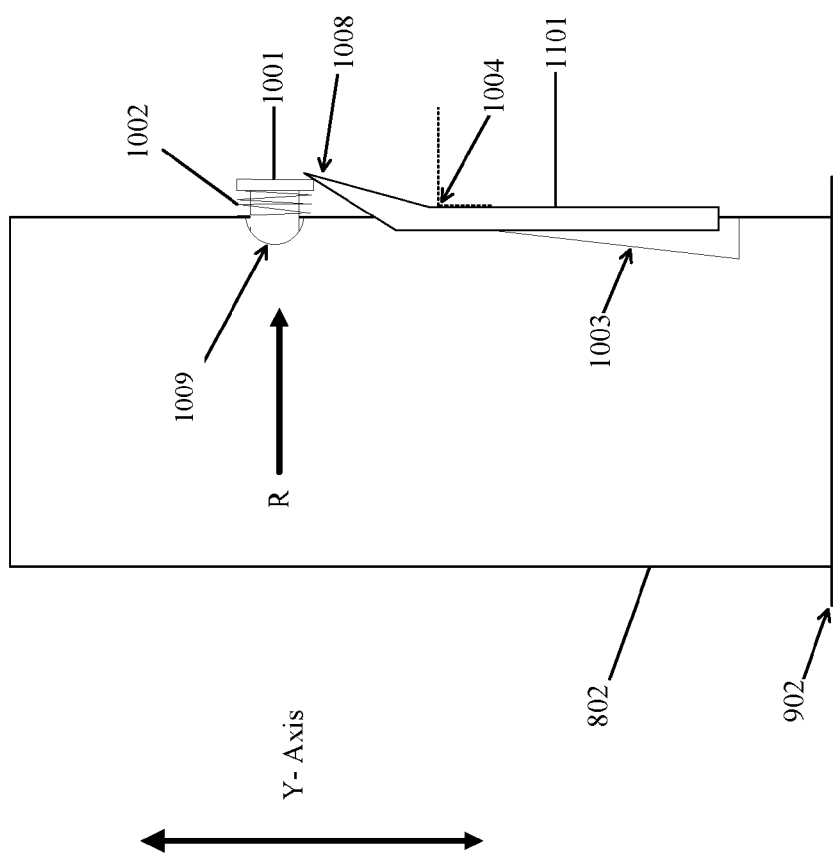

FIGS. 11A and 11B depict the operation of the locking pin 1001. The locking pin 1001 is held into position by the locking pin spring 1002 and pin lever 1101. The locking pin spring 1002 is biased away from surface of the inner connect socket 802 (and the locking pin hole 1009) in direction R, while the pin lever 1101 and its lever pin's point 1008 is pushing the locking pin 1001 opposite to direction R (the opposite direction of locking pin spring 1002). FIG. 11A shows the locking pin 1001 when it's in the locked position and the front end assembly 801 (shown in FIGS. 8A and 8B) cannot be inserted or removed from the inner connect socket 802 because the locking pin head (shown in FIGS. 9 & 10B) blocks the inside of the inner connect socket 802. FIG. 11B shows the locking pin 1001 when it is not in the locked position, which occurs when the pin lever's point 1008 is no longer pushing down on the locking pin 1001 as hard in a direction opposite of direction R and allows the inner connect socket to be clear of the locking pin head 901. The amount of force the pin lever's point 1008 puts on the locking pin 1001 is determined by the positioning of the outer sleeve cover's 803 inside ridge 1004 (which is shown in FIG. 11A and as a dotted line to help explain the mechanism's mechanics). The pin lever 1004 slightly rotates around the balancing point ridge 1006 (shown in FIG. 10B) when the inside ridge 1004 moves downward in the Y direction, which occurs when the user has pushed the outer slide cover 803 downward (as shown in FIG. 8B). When the outer slide cover 803 is pushed downward in the Y direction, it allows for the pin lever 1101 to slightly rotate; the pin lever 1101 will rotate when allowed to do so because of the force transferred upon the pin lever's point 1008 from the locking spring 1002 through the locking pin 1001.

The current embodiment depicts the outer slide cover 803 having a square inside ridge 1004, but alternate embodiments may allow for a sloped inside ridge 1004 that would act upon the locking pin 1001 directly. Alternate embodiments may be configured with a quick connect mechanism 850 that works by pushing on the outer slide cover 803 in the opposite direction.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A bicycle frame connecting mechanism comprising:
   an inner receiver configured to receive a frame piece;
   an outer cover element slidably arranged and concentrically surrounding the inner receiver and biased in a first direction by a biasing mechanism;
   a locking element arranged on the inner receiver and configured to engage the frame piece through the inner receiver and prevent removal of the frame piece;
   wherein:
      sliding the outer cover element along the inner receiver in a second direction opposite the first direction releases the locking element from engagement with the frame piece; and
      when the frame piece is inserted into the inner receiver the frame piece is prevented from being removed due to the locking element; and wherein the bicycle frame connecting mechanism is configured to be mounted directly adjacent to a head tube.

2. The connecting mechanism as in claim 1, wherein the frame piece is in a front fork assembly.

3. The connecting mechanism as in claim 1, wherein the frame piece is handlebars.

4. The connecting mechanism as in claim 1, wherein the frame piece includes a ski.

5. The connecting mechanism as in claim 1, wherein the frame piece includes a wheel.

6. The connecting mechanism as in claim 1, wherein the locking element comprises a lever pivotable by the positioning of the outer cover element.

7. The connecting mechanism as in claim 1, wherein the locking element comprises a locking pin biased in an open position but held in a closed position by the positioning of the outer cover element.

* * * * *